United States Patent
Bamberg et al.

(10) Patent No.: US 9,696,142 B2
(45) Date of Patent: Jul. 4, 2017

(54) METHOD AND APPARATUS FOR DETERMINING RESIDUAL STRESSES OF A COMPONENT

(71) Applicant: MTU Aero Engines AG, Munich (DE)

(72) Inventors: Joachim Bamberg, Dachau (DE); Roland Hessert, Herrsching (DE)

(73) Assignee: MTU Aero Engines AG, Munich (DE)

( * ) Notice: Subject to any disclaimer, the term of this patent is extended or adjusted under 35 U.S.C. 154(b) by 141 days.

(21) Appl. No.: 14/614,061

(22) Filed: Feb. 4, 2015

(65) Prior Publication Data

US 2015/0219444 A1    Aug. 6, 2015

(30) Foreign Application Priority Data

Feb. 5, 2014 (DE) .................. 10 2014 202 020

(51) Int. Cl.
*G01B 11/16* (2006.01)
*B22F 3/105* (2006.01)
(Continued)

(52) U.S. Cl.
CPC .......... *G01B 11/162* (2013.01); *B22F 3/1055* (2013.01); *B23K 26/032* (2013.01); *B28B 1/001* (2013.01); *B28B 17/00* (2013.01); *B29C 67/0077* (2013.01); *B29C 67/0085* (2013.01); *B29C 67/0088* (2013.01); *G01L 1/24* (2013.01);
(Continued)

(58) Field of Classification Search
CPC .......... B22F 2003/1056; B22F 3/1055; B23K 26/032; B28B 17/00; B28B 1/001; B29C 67/0077; B29C 67/0085; B29C 67/0088; B33Y 10/00; B33Y 50/00; G01B 11/162; G01L 1/24; G01L 5/0047
See application file for complete search history.

(56) References Cited

U.S. PATENT DOCUMENTS 4,248,094 A * 2/1981 Thompson ................ G01L 1/22
                                                     73/760
5,432,595 A * 7/1995 Pechersky ............ G01B 11/162
                                                     356/35.5

(Continued)

FOREIGN PATENT DOCUMENTS

DE            3017600       11/1980
DE      10 2011 009 624      8/2012

*Primary Examiner* — Jessee Roe
*Assistant Examiner* — Nicholas Wang
(74) *Attorney, Agent, or Firm* — Davidson, Davidson & Kappel, LLC

(57) ABSTRACT

A method for determining residual stresses of a component (14), in particular a component of an aircraft engine, while it is being manufactured by an additive manufacturing process. The method includes the following steps: creating at least one local melt pool (26) in a surface (24) of the component (14) to be manufactured after a predetermined portion of the component is completed; optically detecting surface distortions and/or elongations occurring at least in a region around the created melt pool (26); and determining the residual stresses of the component (14) which are present at least in the region around the created melt pool (26) based on the optically detected surface distortions and/or elongations. Further an apparatus for determining residual stresses of a component (14) while it is being manufactured by an additive manufacturing process is provided.

12 Claims, 1 Drawing Sheet

(51) Int. Cl.
*B23K 26/03* (2006.01)
*B28B 1/00* (2006.01)
*B28B 17/00* (2006.01)
*B29C 67/00* (2017.01)
*G01L 1/24* (2006.01)
*G01L 5/00* (2006.01)
*B33Y 10/00* (2015.01)
*B33Y 50/00* (2015.01)
*B29L 31/30* (2006.01)

(52) U.S. Cl.
CPC .... *G01L 5/0047* (2013.01); *B22F 2003/1056* (2013.01); *B29L 2031/3076* (2013.01); *B33Y 10/00* (2014.12); *B33Y 50/00* (2014.12)

(56) References Cited

U.S. PATENT DOCUMENTS

| | | | |
|---|---|---|---|
| 6,553,275 B1* | 4/2003 | Mazumder | G01L 5/0047 700/118 |
| 7,286,893 B1 | 10/2007 | Mazunder | |
| 2013/0196118 A1 | 8/2013 | Bamberg et al. | |
| 2013/0343947 A1 | 12/2013 | Satzger et al. | |

* cited by examiner

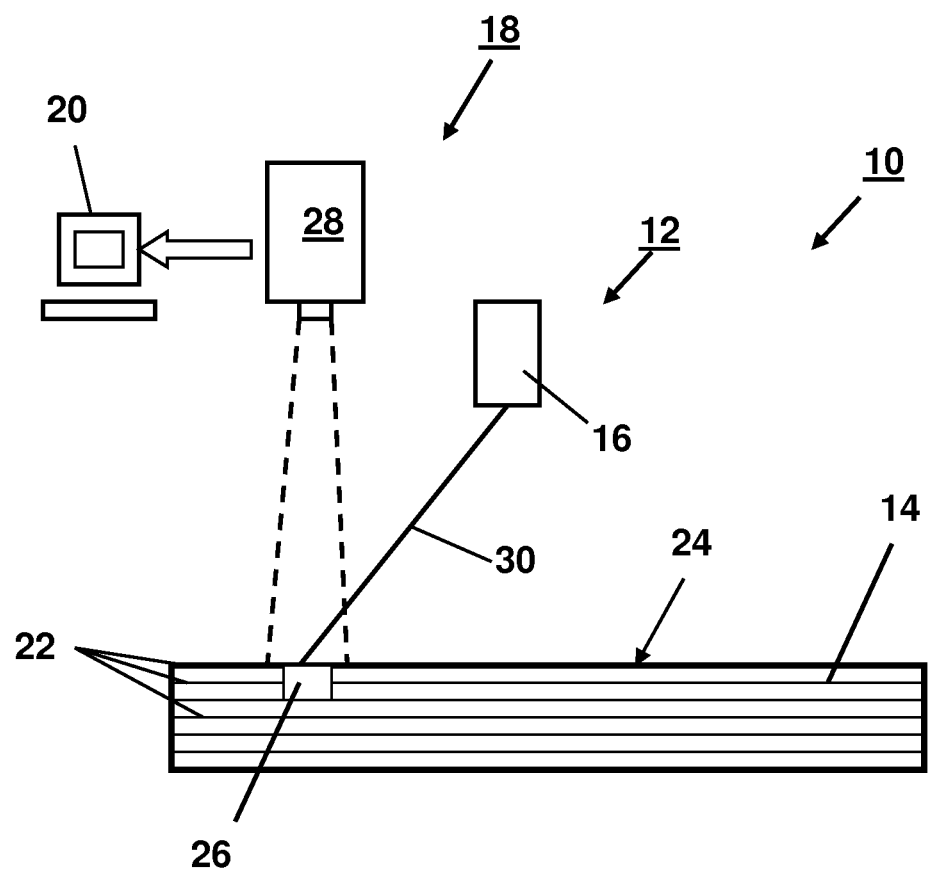

METHOD AND APPARATUS FOR DETERMINING RESIDUAL STRESSES OF A COMPONENT

This claims the benefit of German Patent Application DE 10 2014 20 20 20.4, filed Feb. 5, 2014 and hereby incorporated by reference herein.

The present invention relates to a method for determining residual stresses of a component, in particular a component of an aircraft engine, while it is being manufactured by an additive manufacturing process. Moreover, the present invention relates to an apparatus for determining residual stresses of a component while it is being manufactured by an additive manufacturing process.

BACKGROUND

During additive manufacture of components using, for example, selective laser melting, typically high residual stresses are produced which are specific to the particular components. Such residual stresses may lead to the formation of cracks during build-up of the component, or may result in component distortions during subsequent heat treatment. Residual stress analyses are typically performed using X-ray methods and/or the so-called hole-drilling method. However, with these methods, it is only possible to examine surface layers of components in a locally partially destructive manner. Moreover, the surface of the component must not be excessively curved. A method for measuring residual stresses of a component while it is being manufactured by an additive manufacturing process is described in U.S. Pat. No. 6,553,275 B1. In this method, a powder material to be melted by a laser is disposed on a substrate provided with strain gauges on its rear surface. Residual stresses arising during the manufacture of the component are determined via the elongations indirectly measured by the strain gauges.

SUMMARY OF THE INVENTION

The known methods have the disadvantage that they predominantly operate partially destructively, at least locally, or are relatively complex and inaccurate.

It is an object of the present invention to provide a method for determining residual stresses of a component while it is being manufactured by an additive manufacturing process, which method can be used non-destructively on the component, is relatively easy to perform, and allows accurate determinations of residual stresses to be performed on the component to be manufactured. Another object of the present invention is to provide an apparatus suitable for carrying out this method.

The present invention provides a method for determining residual stresses of a component, in particular a component of an aircraft engine, while it is being manufactured by an additive manufacturing process includes the following steps: creating at least one local melt pool in a surface of the component to be manufactured after a predetermined component portion is completed; optically detecting surface distortions and/or elongations occurring at least in a region around the created melt pool; and determining the residual stresses of the component which are present at least in the region around the created melt pool based on the optically detected surface distortions and/or elongations. The method according to the present invention enables on-line analysis of residual stresses during the additive manufacture of components for purposes of process control, process optimization, and component quality control. The method of the present invention operates non-destructively, because after completion of the measurement, the molten pool resolidifies, and the build-up of the component may be continued substantially unaffected. No material of the component is consumed during the measurement of residual stresses, as would be the case, for example, in the hole-drilling method. Furthermore, the method of the present invention is relatively easy to perform because no additional elements, such as, for example, strain gauges, need to be mounted on or in the component. Since the method of the present invention allows arbitrary portions or structures of the component being manufactured to be examined three-dimensionally, non-destructively and rapidly without contact therewith, a more accurate picture of the residual stress is obtained during the manufacture of the component. Using the method according to the present invention, it is possible to reliably acquire a wealth of residual stress data about the entire component. This also provides the advantage that beneficial residual stresses may be deliberately induced in the component, if desired. Finally, it is possible to validate residual stress simulation calculations using the method according to the present invention. "Surface distortions and/or elongations" are understood to be the surface area deformations occurring in the region of the created melt pool. In particular, surface distortions should be regarded as a type of surface elongations.

In an advantageous embodiment of the method according to the present invention, the additive manufacturing process is an additive layer manufacturing process, and the creation of at least one local melt pool in the surface of the component is effected after a predetermined number of additively manufactured component layers are completed. Depending on the type and geometry of the component to be manufactured, the position of the local melt pools, on the one hand, and also their creation may be carried out after a predetermined number of component layers are created.

Advantageously, there is also the possibility of representing residual stresses layer by layer during the manufacture of the component and, possibly, of graphically representing such residual stresses three-dimensionally after the completion of the component. This, in turn, may be used to validate residual stress simulation calculations for the components concerned, or also to induce beneficial residual stresses in the component.

In another advantageous embodiment of the method according to the present invention, the optical detection of the surface distortions and/or elongations is carried out using an optical distortion-based method, in particular, a speckle interferometry method. Such optical distortion-based methods are used in known manner for residual stress measurements using the hole-drilling method. However, in the known hole-drilling method, the optical detection of the elongations is hindered by the drilling unit. This disadvantage does not exist in the method of the present invention because the melting laser can be positioned outside the optical detection area. In particular, the melting laser beam may be directed at an angle to the surface. The removal of residual stresses by the local melt pool in this region of the component results in a corresponding change or redistribution of the remaining residual stresses in this region, leading to surface distortions and/or elongations in the region around the local melt pool. The shape of the surface distortions and/or elongations allows for calculation of the residual stresses that are present in the component portion or component layer prior to the creation of the local melt pool. In order to perform the optical distortion measurement, in particular the speckle interferometry method, at least the region around the created melt pool is irradiated with coherent laser light. The interference pattern created by the laser light, such as, for example, a so-called speckle pattern, is detected by an optical detection device. Surface distortions and/or elongations cause these patterns to change. The occurring residual stresses can be calculated from the change in these patterns.

Further advantages are obtained when the component is manufactured by an additive layer manufacturing process, in particular by selective laser melting and/or selective laser sintering. The use of an additive layer manufacturing process in conjunction with a layer-by-layer determination of residual stresses of the component during the additive manufacture thereof enables a particularly accurate assessment of the manufacturing quality of the component. In addition, the use of the additive layer manufacturing process enables rapid and economic production of geometrically complex components in large numbers, which provides significant time and cost advantages in the manufacture of engine components. In selective laser melting, thin powder layers of the material or materials used are deposited on a manufacturing zone, locally melted by one or more laser beams, and solidified. Subsequently, the manufacturing zone is lowered, another powder layer is deposited and again locally solidified. This cycle is repeated until the component is completed. The completed component may then be further processed, if necessary, or used immediately. In selective laser sintering, the component is manufactured in a similar way by laser-based sintering of powder materials.

In another advantageous embodiment of the method according to the present invention, the local melt pool is created by laser energy. This makes it possible to create small and precisely positioned melt pools in all regions of the component surface during the additive manufacture of the component. The depth of the melt pool can be adjusted by varying the laser power and/or the time of exposure to the laser beam. However, the local melt pool may also be created using other energy sources. But if laser energy is used, the local melt pool may be created using a laser light source that is used for the selective laser melting process and/or the selective laser sintering process. This reduces the complexity of the overall apparatus. Advantageously, there is also the possibility of using one common laser light source for irradiating at least the region around the created melt pool in order to perform the speckle interferometry method, for creating the local melt pool, and for selective laser melting and/or selective laser sintering. Advantageously, in addition to the relatively low complexity of the apparatus, there is also the possibility of using existing laser-based additive manufacturing equipment also for performing the speckle interferometry method, and thus for optically detecting the occurring surface distortions and/or elongations.

In other advantageous embodiments of the method according to the present invention, the locally created melt pool has a predefined geometry. In particular, annular or circular geometries are advantageous because they enable a particularly accurate representation or calculation of the residual stresses of the component based on the optically detected surface distortions and/or elongations. Typically, the locally created melt pool has an average diameter from 0.5 to 3.0 mm and a depth from 0.1 to 1.0 mm. However, these values may readily be higher or lower.

In another embodiment of the present invention, particularly detailed quality control of the component to be manufactured is achieved by creating at least two melt pools in component surfaces of different portions or layers of the component, and optically detecting the respective surface distortions and/or elongations occurring in the regions around the respective melt pools in order to determine residual stresses of the component during its manufacture. This makes it possible to determine occurring residual stresses in different planes of the component; i.e., in different portions or layers of the component. By selecting a suitable number of melt pools and corresponding residual stress measurements or calculations, it is possible to obtain a complete and possibly full picture of the residual stresses throughout the manufacturing process of the component. This makes it possible, for example, to induce beneficial residual stresses in the component during its manufacture. Again, it is also possible to validate residual stress simulation calculations.

The method of the present invention described hereinabove may also be used to produce a reference component or a calibration body. This makes it possible to determine and predefine manufacturing parameters which are optimized with respect to the residual stresses. Moreover, based on the results or a comparison with the residual stresses of the reference component or the calibration body, it is possible to perform quality control on the components that are additively manufactured according to the predefined parameters.

Another aspect of the present invention relates to an apparatus for determining residual stresses of a component, in particular a component of an aircraft engine, while it is being manufactured by an additive manufacturing process. The apparatus according to the present invention includes an additive manufacturing device for manufacturing the component, a device for creating at least one local melt pool in a surface of the component to be manufactured after a predetermined portion of the component is completed, an optical detection device adapted to detect surface distortions and/or elongations of the component surface at least in the region around the created melt pool, and a computing device by means of which the existing residual stresses of the component are determined at least in the region around the created melt pool based on the optically detected surface distortions and/or elongations. Such an apparatus allows non-destructive and accurate determination of residual stresses to be performed on the component to be manufactured and allows arbitrary structures of the component to be examined three-dimensionally. Further advantages reside in the short measurement times and the ability to freely select the size and position of the measurement location; i.e., of the local melt pool to be created. In addition, the additive manufacturing process remains unaffected because, upon completion of the residual stress determination, the local melt pool resolidifies and the additive build-up of the component can be continued unaffected. Further resulting advantages are apparent from the preceding description of the first aspect of the invention.

In an advantageous embodiment of the present invention, the additive manufacturing device includes or is a device for selective laser melting and/or selective laser sintering having at least one laser light source. This makes it possible to manufacture components of arbitrary three-dimensional geometries, whose mechanical properties substantially correspond to those of the material used, and to assess these components with respect to the occurring residual stresses, and thus in terms of their manufacturing quality. Suitable materials include, for example, metals, metal alloys such as steel, aluminum and aluminum alloys, titanium and titanium alloys, cobalt alloys and/or chromium alloys, nickel-based alloys and copper alloys, as well as ceramic materials and plastics.

In another advantageous embodiment of the present invention, the detection device includes at least one camera unit and at least one laser light source. The camera unit may include sCMOS- and/or CCD- and/or CMOS-based sensors or cameras. Other image-capturing devices are also conceivable. In particular, cameras based on sCMOS sensors provide various advantages, such as a very low read-out noise, a high frame rate, a large dynamic range, a high quantum efficiency, a high resolution, as well as a large sensor area.

In an advantageous embodiment of the apparatus according to the present invention, the additive manufacturing device, the device for creating at least one local melt pool, and the detection device include at least one common laser light source. This advantageously makes it possible to minimize the complexity of the apparatus. In addition, existing additive manufacturing equipment using a laser light source may be readily used or upgraded for determining residual stress during the manufacture of the component.

Other features of the present invention will become apparent from the claims, the exemplary embodiment, and from the drawing. The features and feature combinations mentioned above in the description, as well as the features and feature combination mentioned below in the exemplary embodiments may be used not only in the particular stated combination, but also in other combinations, without departing from the scope of the present invention.

BRIEF DESCRIPTION OF THE DRAWING

The FIGURE shows a schematic representation of the apparatus 10.

DETAILED DESCRIPTION

The FIGURE shows a schematic representation of the apparatus 10 according to the present invention. Apparatus 10 includes an additive manufacturing device 12 for manufacturing a component 14. The additive manufacturing device 12 shown is a device for selective laser melting, which has a laser light source 16.

In order to manufacture component 14, thin powder layers of a high-temperature resistant metal alloy are deposited in a generally known manner on a platform of manufacturing device 12, locally melted by laser 16 or laser beam 30, and solidified by cooling. Subsequently, the platform is lowered, another powder layer is deposited and again solidified.

This cycle is repeated until component 14 is completed. Component 14 may, for example, be made of up to 2000 component layers 22 and have an overall layer height of 40 to 80 mm. The completed component 14 may then be further processed or used immediately. Prior to final completion of component 14, a local melt pool 26 of predefined geometry is created by laser beam 30 of laser light source 16 in a surface 24 of the component 14 to be manufactured after a predetermined number of additively manufactured component layers 22 are completed. Surface distortions and/or elongations occurring in the region around the created melt pool 26 are optically detected by optical detection device 18, which includes, in particular, a camera unit 28. To this end, this region around melt pool 26 is irradiated with laser light from laser light source 16. The changes in the so-called speckle pattern produced by interference of the individual laser beams can be detected by camera unit 28. The speckle pattern changes when surface distortions and/or elongations occur in the region of the irradiated component surface. Based on the optically detected surface distortions and/or elongations, the residual stresses of component 14 which are present in the region around the created melt pool 26 are then calculated in a computing device 20.

The invention claimed is:

1. A method for determining residual stresses of a component while being manufactured by an additive manufacturing process, the method comprising the steps of:
    creating at least one local melt pool via laser energy in a surface of the component being manufactured after a predetermined portion of the component is completed;
    optically detecting surface distortions or elongations occurring at least in a region around the created melt pool, wherein the optical detection of the surface distortions or elongations is carried out using an optical distortion-based method, the optical distortion-based method being a speckle interferometry method; and
    determining residual stresses of the component present at least in the region around the created melt pool based on the optically detected surface distortions or elongations.

2. The method as recited in claim 1 wherein the additive manufacturing process is an additive layer manufacturing process, and the creation of at least one local melt pool in the surface of the component is effected after a predetermined number of additively manufactured component layers are completed.

3. The method as recited in claim 1 wherein the component is manufactured by selective laser melting or selective laser sintering.

4. The method as recited in claim 3 wherein the local melt pool is created using a laser light source used for the selective laser melting process or the selective laser sintering process.

5. The method as recited in claim 1 wherein the locally created melt pool has a predefined geometry.

6. The method as recited in claim 1 wherein the locally created melt pool has an average diameter from 0.5 to 3.0 mm and a depth from 0.1 to 1.0 mm.

7. The method as recited in claim 1 wherein one common laser light source is used for irradiating at least the region around the created melt pool in order to perform a speckle interferometry method, for creating the local melt pool, and for selective laser melting or selective laser sintering.

8. The method as recited in claim 1 wherein, in order to determine residual stresses of the component during manufacture, at least two melt pools of the at least one melt pool are created in component surfaces of different portions or layers of the component, and respectively occurring surface distortions or elongations are optically detected in the regions around the respective melt pools, occurring residual stresses being determined in different planes of the component.

9. The method as recited in claim 1 wherein the component is an aircraft engine component.

10. The method as recited in claim 1 wherein the component is a reference component or a calibration body.

11. The method as recited in claim 10 further comprising manufacturing a further component using the reference component or calibration body for quality control of the further component or to determine and predefine manufacturing parameters for the further component.

12. The method as recited in claim 1 wherein the laser energy is imparted by a melting laser directed at an angle to the surface.

* * * * *